United States Patent
Lee et al.

(10) Patent No.: US 8,165,228 B2
(45) Date of Patent: Apr. 24, 2012

(54) NON-COHERENT TRANSMISSION METHOD FOR UPLINK CONTROL SIGNALS USING A CONSTANT AMPLITUDE ZERO-AUTOCORRELATION SEQUENCE

(75) Inventors: Jung A. Lee, Pittstown, NJ (US); Said Tatesh, Swindon (GB); Hai Zhou, Swindon (GB)

(73) Assignee: Alcatel Lucent, Paris (FR)

( * ) Notice: Subject to any disclaimer, the term of this patent is extended or adjusted under 35 U.S.C. 154(b) by 590 days.

(21) Appl. No.: 11/688,708

(22) Filed: Mar. 20, 2007

(65) Prior Publication Data
US 2008/0232432 A1    Sep. 25, 2008

(51) Int. Cl.
*H04K 1/10* (2006.01)
*H04L 27/28* (2006.01)

(52) U.S. Cl. ....................................................... 375/260
(58) Field of Classification Search ................... 375/260
See application file for complete search history.

(56) References Cited

U.S. PATENT DOCUMENTS

| 2006/0072510 A1* | 4/2006 | Aizawa ........................ 370/333 |
| 2007/0171995 A1* | 7/2007 | Muharemovic et al. ...... 375/260 |
| 2007/0177682 A1* | 8/2007 | Han et al. ..................... 375/260 |
| 2007/0211656 A1* | 9/2007 | Kwak et al. .................. 370/319 |
| 2008/0075195 A1* | 3/2008 | Pajukoski et al. ............ 375/298 |

OTHER PUBLICATIONS

NTT DoCoMo, Ericsson, Fujitsu, Mitsubishi Electric, Sharp, Toshiba Corporation, CDM-based Multiplexing Method of Multiple ACK/NACK and CQI for E-UTRA Uplink, Seoul, Korea, Oct. 9-13, 2006, pp. 1-6.*

* cited by examiner

*Primary Examiner* — David C. Payne
*Assistant Examiner* — Tanmay Shah
(74) *Attorney, Agent, or Firm* — Williams, Morgan & Amerson, PC (57) ABSTRACT

In one embodiment of the instant invention, a non-coherent transmission method for uplink control signals is provided. The transmission methodology uses a constant amplitude zero-autocorrelation (CAZAC) sequence for relatively short control signal lengths. The methodology includes creating a CAZAC sequence, truncating the CAZAC sequence into a plurality of segments; and transmitting each of the segments within a predetermined window of time.

7 Claims, 11 Drawing Sheets

NON-COHERENT TRANSMISSION METHOD FOR UPLINK CONTROL SIGNALS USING A CONSTANT AMPLITUDE ZERO-AUTOCORRELATION SEQUENCE

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations distributed within an area to be serviced by the system. Various users within the area, fixed or mobile, may then access the system and, thus, other interconnected telecommunications systems, via one or more of the base stations. Typically, a mobile device (also known as user equipment (UE)) maintains communications with the system as the mobile device passes through an area by communicating with one and then another base station. The mobile device may communicate with the closest base station, the base station with the strongest signal, the base station with a capacity sufficient to accept communications, etc. Further, each base station may be in communication with a large number of mobile devices.

In a cellular communications system, it is common to transmit a reference signal along with each data signal. As those skilled in the art will appreciate, the reference signal generally makes it easier to properly detect the data signal, especially in non-ideal environments. Accordingly, a large number of reference signals may be needed to support a large number of mobile devices with active communication links. In a reverse link (i.e., from the mobile device to the base station), at least one reference signal is needed for each mobile device. Thus, the number of mobile devices that can be supported in the physical layer may be limited by the number of reference signal sequences that can be generated.

SUMMARY OF THE INVENTION

In one aspect of the instant invention, a method is provided for transmitting control information. The method comprises creating a CAZAC sequence; truncating the CAZAC sequence into a plurality of segments; and transmitting each of those segments within a predetermined window of time.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
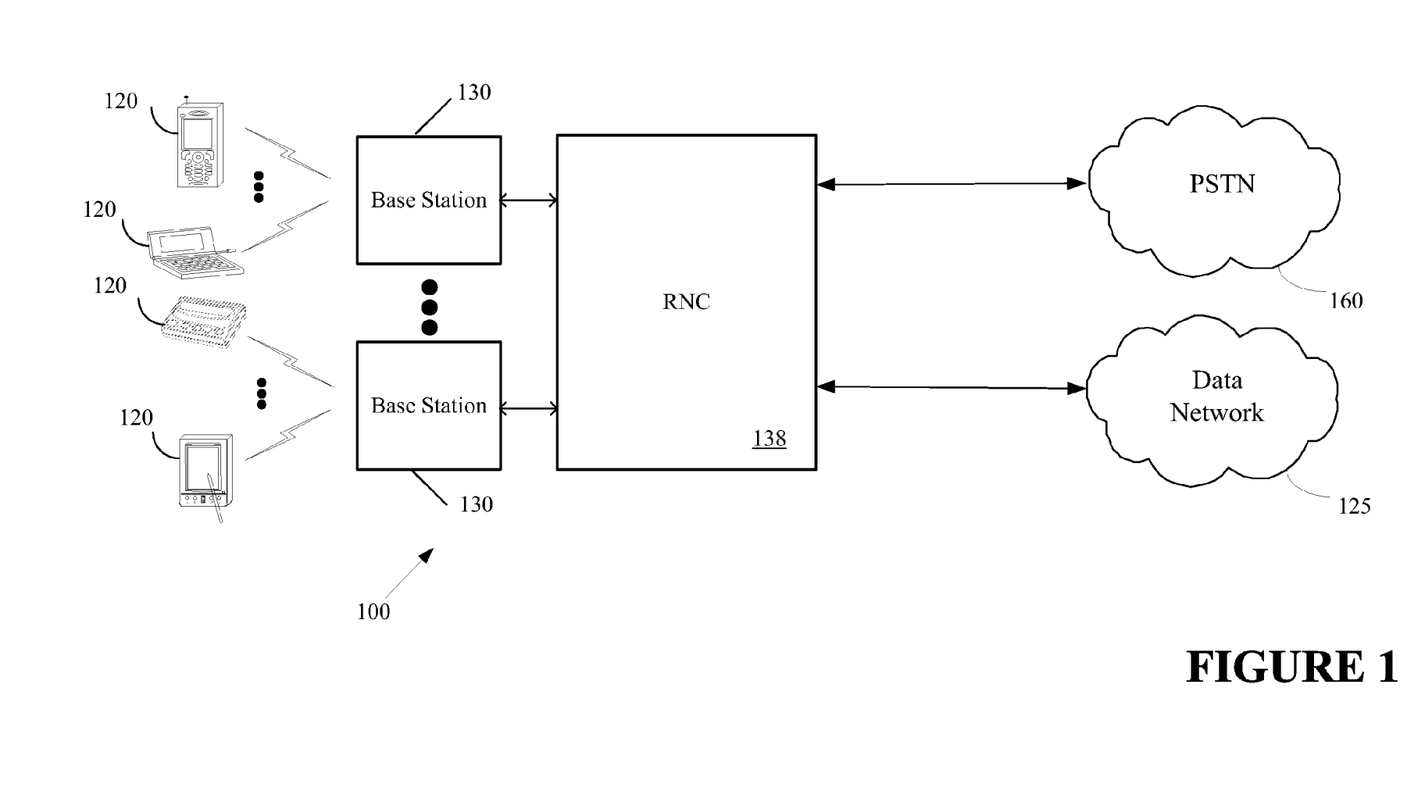
FIG. 1 is a stylistic block diagram of a communications system, in accordance with one embodiment of the present invention.

Turning now to the drawings, and specifically referring to FIG. 1, a communications system 100 is illustrated, in accordance with one embodiment of the present invention. For illustrative purposes, the communications system 100 of FIG. 1 is a wireless telephone system that employs any of a variety of standards commonly known to those of ordinary skill in the art, although it should be understood that the present invention may be applicable to other systems that support data and/or voice communication. The communications system 100 allows one or more mobile devices 120 to communicate with a data network 125, such as the Internet, and/or a public telephone system (PSTN) 160 through one or more base stations 130 and additional circuitry 138, such as a Radio Network Controller (RNC). The mobile device 120 may take the form of any of a variety of devices, including cellular phones, personal digital assistants (PDAs), laptop computers, digital pagers, wireless cards, and any other device capable of accessing the data network 125 and/or the PSTN 160 through the base station 130.

Thus, those skilled in the art will appreciate that the communications system 100 enables the mobile devices 120 to communicate with the data network 125 and/or the PSTN 160. It should be understood, however, that the configuration of the communications system 100 of FIG. 1 is exemplary in nature, and that fewer or additional components may be employed in other embodiments of the communications system 100 without departing from the spirit and scope of the instant invention.

Figure 2:
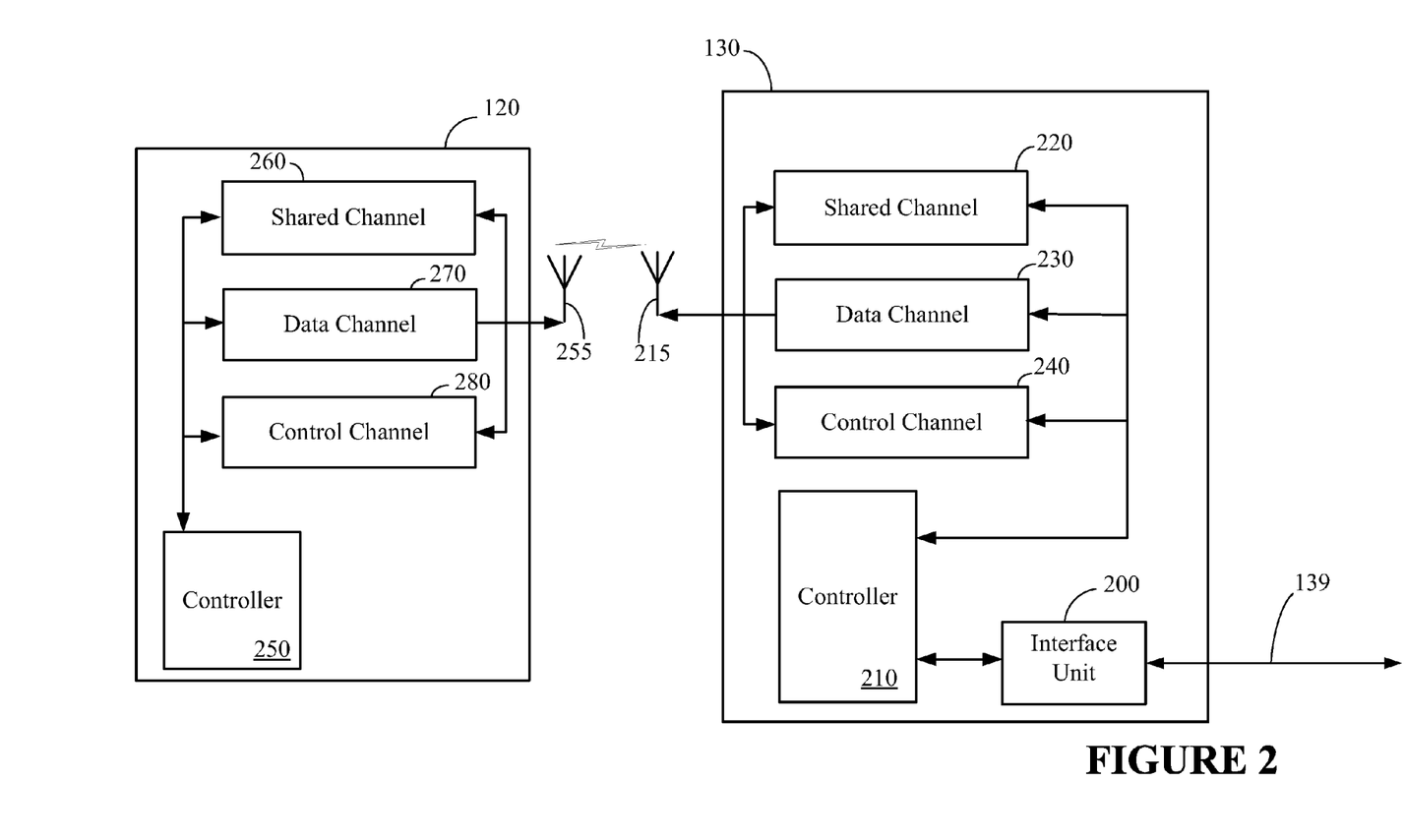
FIG. 2 depicts a block diagram of one embodiment of a base station and a mobile device used in the communications system of FIG. 1.

Referring now to FIG. 2, a block diagram of one embodiment of a functional structure associated with an exemplary base station 130 and mobile device 120 is shown. The base station 130 includes an interface unit 200, a controller 210, an antenna 215 and a plurality of channels: such as a shared channel 220, a data channel 230, and a control channel 240. The interface unit 200, in the illustrated embodiment, controls the flow of information between the base station 130 and upstream circuitry, such as the RNC 138 (shown in FIG. 1). The controller 210 generally operates to control both the transmission and reception of data and control signals over the antenna 215 and the plurality of channels 220, 230, 240 and to communicate at least portions of the received information to the RNC 138 via the interface unit 200.

The mobile device 120 shares certain functional attributes with the base station 130. For example, the mobile device 120 includes a controller 250, an antenna 255 and a plurality of channels: such as a shared channel 260, a data channel 270, and a control channel 280. The controller 250 generally operates to control both the transmission and reception of data and control signals over the antenna 255 and the plurality of channels 260, 270, 280.

Normally, the channels 260, 270, 280 in the mobile device 120 communicate with the corresponding channels 220, 230, 240 in the base station 130 and may consist of both uplink and downlink channels. Under the operation of the controllers 210, 250, the channels 220, 260; 230, 270; 240, 280 are used to effect a controlled scheduling of communications from the mobile device 120 to the base station 130.

In one embodiment of the instant invention, control signals, such as ACK/NACK and CQI signals, are transmitted from the mobile devices 120 to the base stations 130 using a code data multiplexing (CDM) scheme. Considering differences in quality of signal (QoS) (error rate, latency) requirements and the frequency of ACK/NAK and CQI feedback, some embodiments of the instant invention may successfully utilize a time data multiplexing (TDM) approach between the two types of control signals for the mobile device 120. In the illustrated embodiment of the instant invention, the ACK/NAK channel structure is described and discussed; however, those of ordinary skill in the art will appreciate that the instant invention may find advantageous application in other channel structures.

In one embodiment of the instant invention, a non-coherent transmission method for uplink control signals is provided. The transmission scheme uses constant amplitude zero-autocorrelation (CAZAC) sequence for control signals. The CAZAC sequence occupies an entire slot and is repeated over the two slots with frequency hopping. At the receiver, non-coherent detection is employed. Compared with existing solution, the invention provides a larger number of sequences, and thereby supports a large number of users with superior detection performance compared with existing solutions.

Two alternative CDM approaches may be used for a non data-associated control signal channel. Both of these alternatives provide CDM using a constant amplitude zero-autocorrelation (CAZAC) sequence. In particular, both approaches use a CAZAC sequence specific to a particular mobile device 120 for transmitting ACK/NAK information. This approach advantageously eliminates the need for reference signal (RS) demodulation and is particularly suited for transmitting small amounts of control information.

Figure 3:
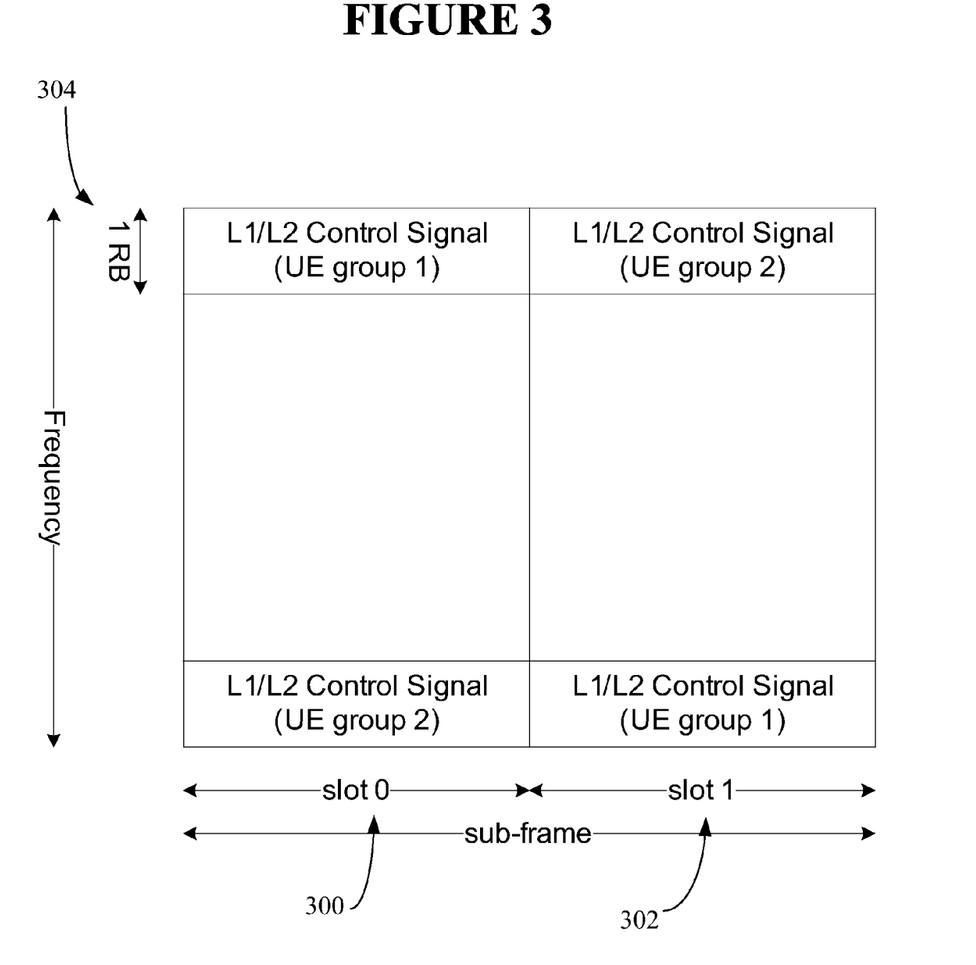
FIG. 3 is a stylistic representation of a time-frequency allocation for an Acknowledge/No Acknowledge (ACK/NACK) channel.

Turning now to FIG. 3, a typical time-frequency allocation for the ACK/NAK channel is stylistically shown. The ACK/NAK transmission occurs over a complete sub-frame, which is comprised of 2 slots in time (slot 0 and slot 1 300, 302) and in a single resource block (RB) 304, which in the illustrated embodiment is comprised of 12 sub carriers in frequency. Frequency hopping occurs at the slot boundary.

Figure 4A:
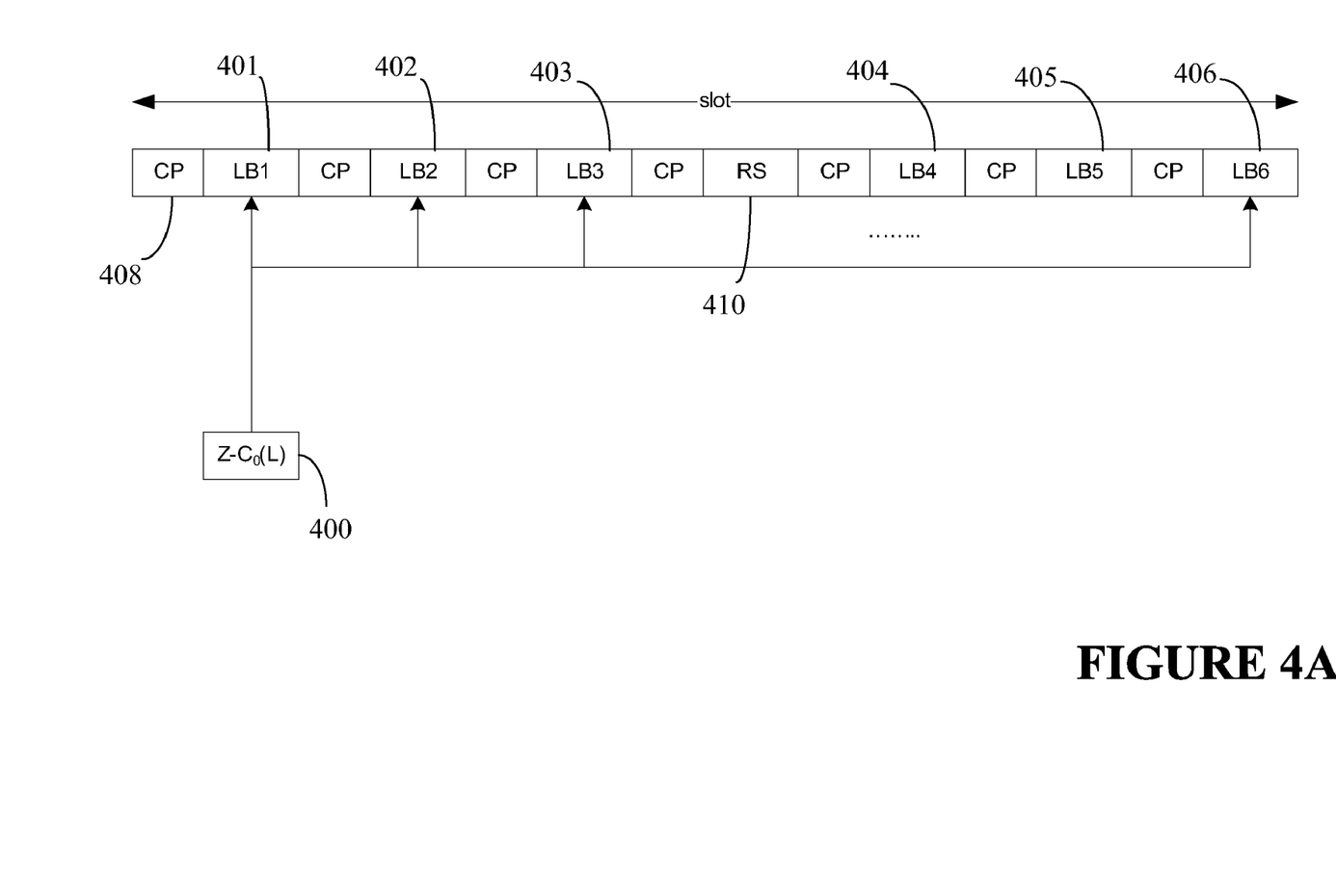
FIGS. 4A and 4B depict alternative embodiments of a mapping of a Zadoff-Chu sequence for an ACK/NACK transmission.
Figure 4B:
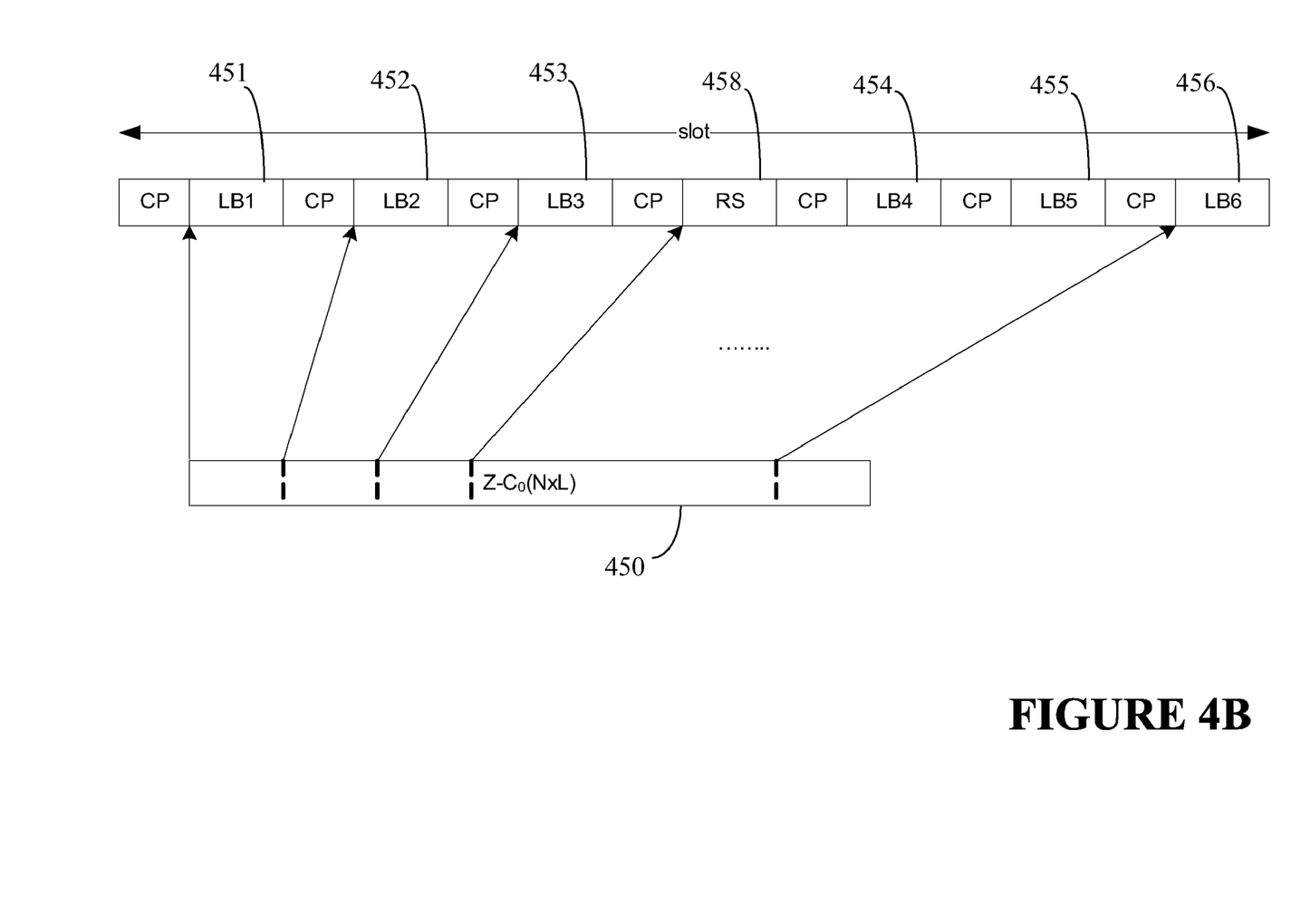

FIGS. 4A and 4B respectively illustrate the two embodiments of the ACK/NAK channel structures. In both schemes, the sequence is repeated over two slots in a subframe. FIG. 4A illustrates a first scheme in which a Length L=12 CAZAC sequence 400 is transmitted within a long block (LB) repeated over N LBs, where N=6 in the illustrated embodiment such that the Length-12 CAZAC is repeated six times in the long blocks LB1-LB6 401-406. Those skilled in the art will appreciate that each of the LBs 401-406 is preceded by a cyclical prefix (CP) 408. Additionally, provision has been made for an RS 410, but need not be utilized in the instant invention so as to avoid the overhead associated therewith. Thus, in one embodiment of the instant invention, no transmission occurs during the RS 410.

FIG. 4B illustrates a second scheme in which a CAZAC sequence 450 of length L=N×12 is mapped to multiple LBs 451-456 within the slot. Additionally, since the RS 458 is not being used in the second scheme, a portion of the CAZAC sequence 450 may be transmitted during this period as well. A truncated Zadoff-Chu sequence or a cyclic extension of the Zadoff-Chu sequence may be considered to generate a length N×12 sequence, where N is the number of LBs available, which in one embodiment includes LB1-LB6 and RS for a total of N=7. Those skilled in the art will appreciate that a greater or lesser number of LBs may be employed, as desired. For example, in some applications, it may be useful to use all seven of the available LBs, while in other applications it may only be necessary to use five of the available LBs. Proper programming of the base stations 130 will allow them to retrieve the portions of the CAZAC sequence from the appropriate LBs and then reassemble the original Zadoff-Chu sequence.

As an example, a length L=13 Zadoff-Chu sequence may be used for Scheme 1. For Scheme 2 with N=5/6/7, truncated Zadoff-Chu sequences of lengths 61/73/87 may be used. Orthogonal sequences are generated by cyclic shift of a root Zadoff-Chu sequence. The number of orthogonal sequences for the two schemes are as follows:

Scheme 1: 12 orthogonal sequences are generated by cyclic shift by one;

Scheme 2: 61/73/87 sequences are generated by cyclic shift by one (where N=5/6/7).

Scheme 2 offers a substantially larger number of sequences, which permits a larger number of mobile devices to be multiplexed in the same time-frequency region.

Detection performance for the two ACK/NACK transmission schemes was analyzed by link-level simulation. The simulation parameters are shown in Table 1 below.

TABLE 1

Link-level simulation parameters.

| Parameter | Assumption |
| --- | --- |
| Carrier frequency | 2.5 GHz |
| Transmission Bandwidth | 10 MHz |
| Resource block size | 12 sub-carriers |
| Number of LBs for ACK/NAK (N) | 5/6/7 LBs per slot<br>2 slots with frequency hopping |
| ACK/NAK structure | Scheme 1: Zadoff-Chu sequence (Length = 12) with N times repetition.<br>Scheme 2: Zadoff-Chu sequence (Length = N × 12).<br>N = 5/6/7 |
| ACK/NAK detection algorithm | Energy detection<br>Scheme 1: Coherent in same LB, non-coherent sum over LBs and slots.<br>Scheme 2: Coherent over LBs in a slot. Non-coherent over 2 slots. |

TABLE 1-continued

Link-level simulation parameters.

| Parameter | Assumption |
|---|---|
| False alarm probability | 0.1% |
| Channel model | AWGN, GSM TU 3 km/hr |
| Number of transmit antennas | 1 |
| Number of receive antennas | 2 |

An energy detection algorithm with Neyman-Pearson criterion on false alarm probability was used in the simulation. The number of ACK/NAK LBs was 5/6/7. For Scheme 1, the detection metric was computed by coherent accumulation in each LB, and by a non-coherent sum over LBs and slots. For Scheme 2, the detection metric was computed by coherent accumulation over all occupied LBs in a slot and by non-coherent sum over two slots. In the simulation, Scheme 2 outperformed Scheme 1 by 3.7 dB for N=5 and by 4.2 dB for N=6 and 7, in AWGN channel.

Figure 5:
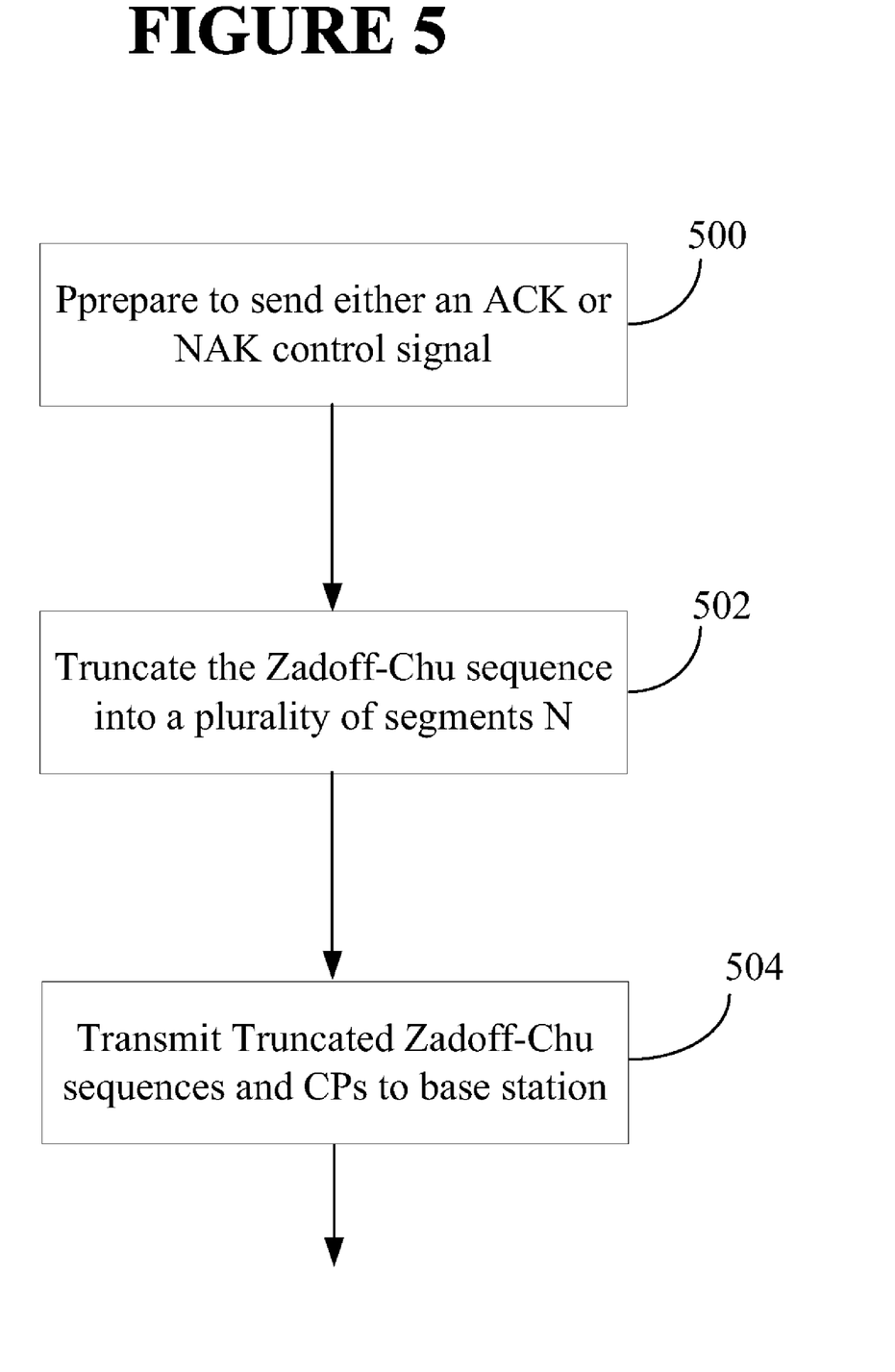
FIG. 5 depicts a stylized representation of a flow chart of one embodiment of a control routine that may be implemented in the base station of FIGS. 1 and 2.

Turning now to FIG. 5, a stylized representation of a flow chart of one embodiment of a control routine that may be implemented in the mobile devices of FIGS. 1 and 2 to implement Scheme 2 is shown. In particular, the process begins at block 500 with the mobile device 120 preparing to send either an ACK or NAK control signal. At block 502, the control routine of the mobile device 120 truncates the Zadoff-Chu sequence into a plurality of segments N, where N has been previously established to represent the number of LBs that will be occupied with each of the truncated Zadoff-Chu sequences. Thereafter, at block 504, the sequence of CPs and LBs are transmitted by the mobile device 120 to the base station 130.

Figure 6:
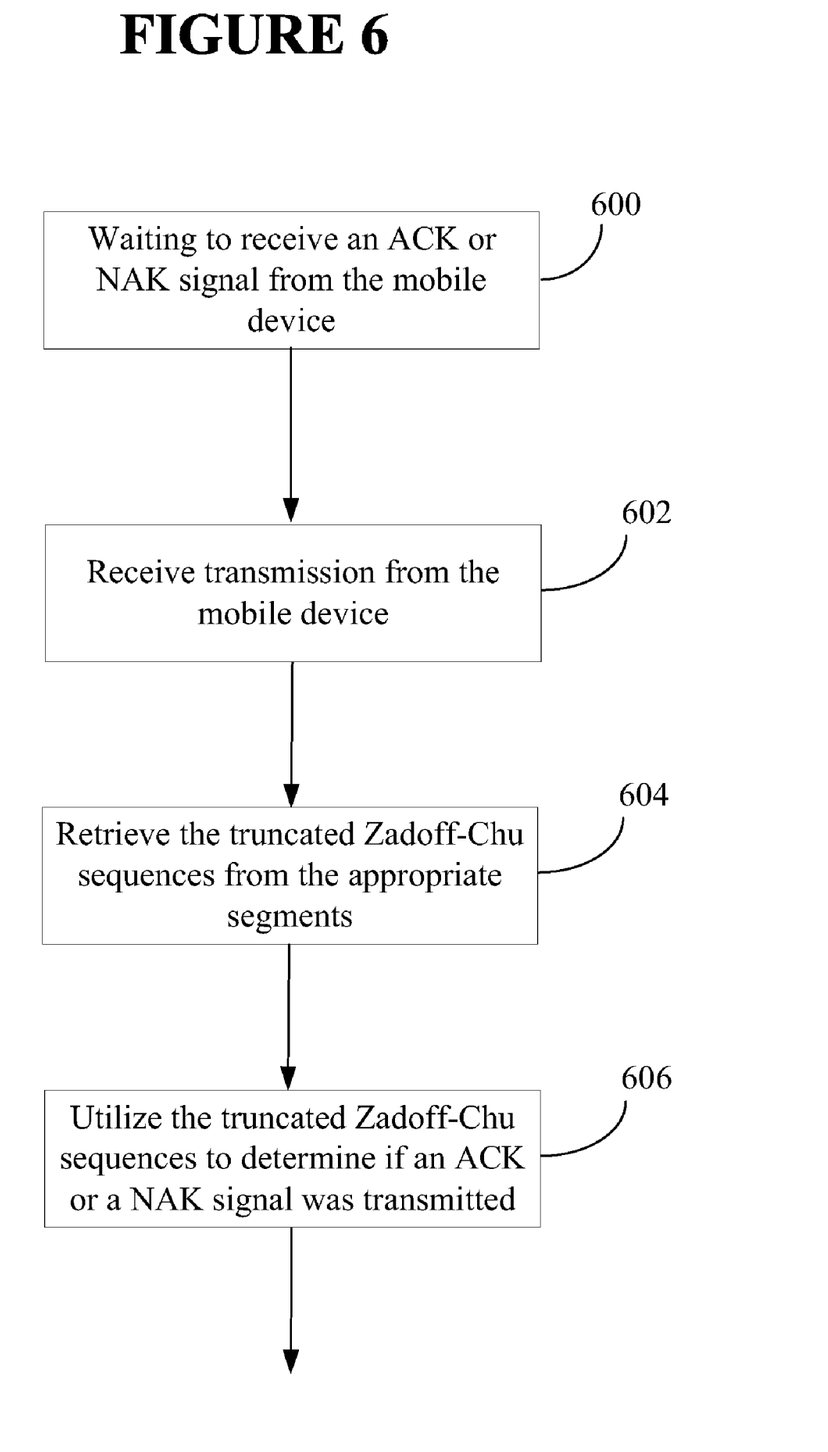
FIG. 6 depicts a stylized representation of a flow chart of one embodiment of a control routine that may be implemented in the mobile devices of FIGS. 1 and 2.

FIG. 6 depicts a stylized representation of a flow chart of one embodiment of a control routine that may be implemented in the base stations 130 of FIGS. 1 and 2. The process begins at block 600 with the base station 130 waiting to receive an ACK or NAK signal from the mobile device 120. At block 602, the control routine receives the transmission from the mobile device 120. Because N has been previously established, the control routine of the base station 130 "knows" which of the LBs contain the truncated Zadoff-Chu sequences, and thus, at block 604, the control routine retrieves them from the appropriate segments. Thereafter, at block 606, the control routine utilizes the truncated Zadoff-Chu sequences to determine if an ACK or a NAK signal was transmitted by the mobile device 120.

Those skilled in the art will appreciate that a reference signal (RS) is not necessary for the based station 130 to properly determine whether the mobile device 120 had transmitted an ACK or a NAK signal. Accordingly, the instant invention does not suffer from the overhead normally associated with the transmission of such reference signals.

As discussed above, a basic CAZAC sequence of length P is generated. In one exemplary embodiment of the instant invention, a Zadoff-Chu sequence $c_p(n)$ of length P is generated using the following equation:

$$c_p(n) = \begin{cases} \exp\left[\frac{j2\pi p}{P}\left(n + \frac{n(n+1)}{2}\right)\right] & \text{for } P \text{ odd} \\ \exp\left[\frac{j2\pi p}{P}\left(n + \frac{n^2}{2}\right)\right] & \text{for } P \text{ even} \end{cases}$$

By selecting different values for p, different root Zadoff-Chu sequence can be generated. The number of sequences is (P−1) for a prime number P. An orthogonal Zadoff-Chu sequence can be generated by a cyclic shift operation of each of the root Zadoff-Chu sequences.

Figure 7A:
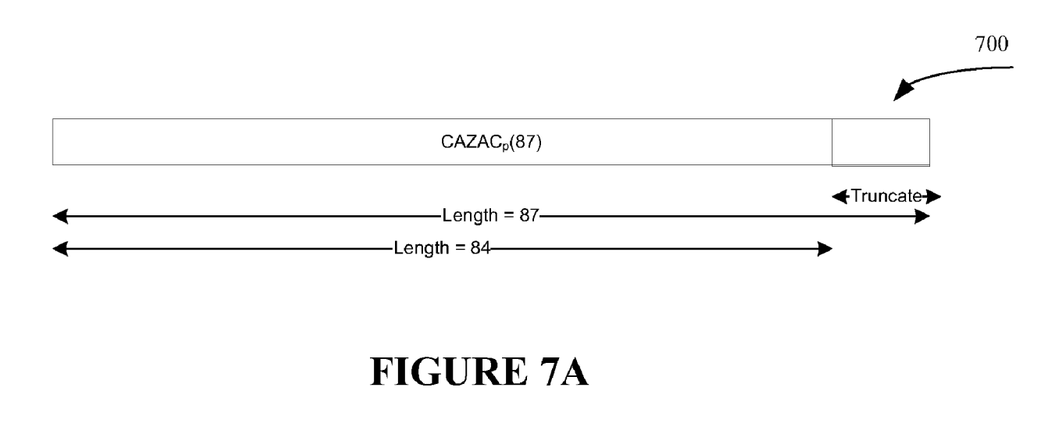
FIGS. 7A and 7B illustrates alternative methodologies for generating a sequence having a length 84.
Figure 7B:
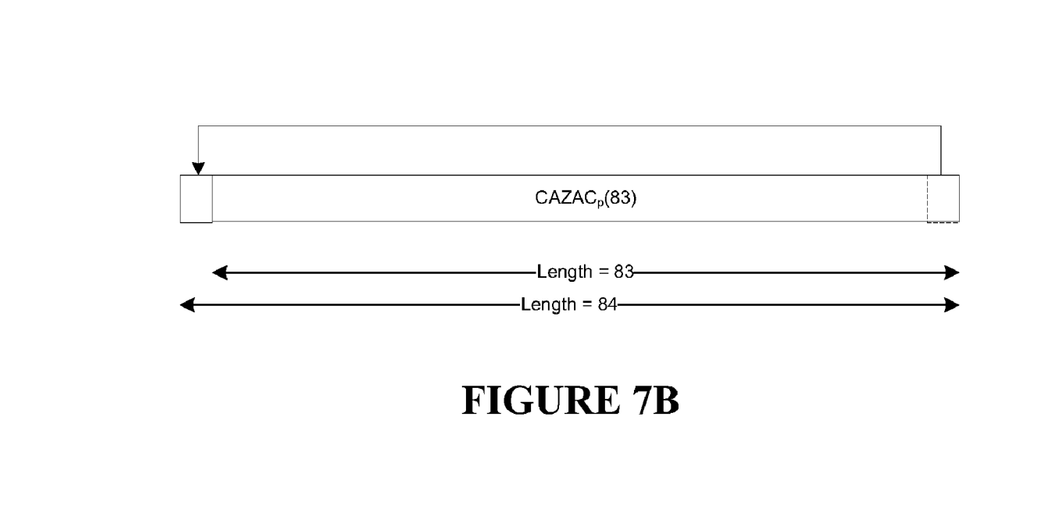

The number of samples that can be transmitted in a slot is N×K, where N denotes the number of blocks (LB or RS blocks) and K denotes the number of sub-carriers in a RB. To have the maximum number of sequences, a prime length sequence is desirable. For example, as shown in FIG. 7A, a sequence of length P=87 may be generated according to the equation described above. Then, 3 samples 700 at the end can be truncated to produce a sequence of length 84. Alternatively, as shown in FIG. 7B, a sequence of length P=83 can be generated and cyclically extended to a length of 84. This methodology could be specified in an industry standard or may be configurable and known to the transmitter and the receiver. At the receiver, the truncated or extended signal is detected by using a correlator.

Figure 8:
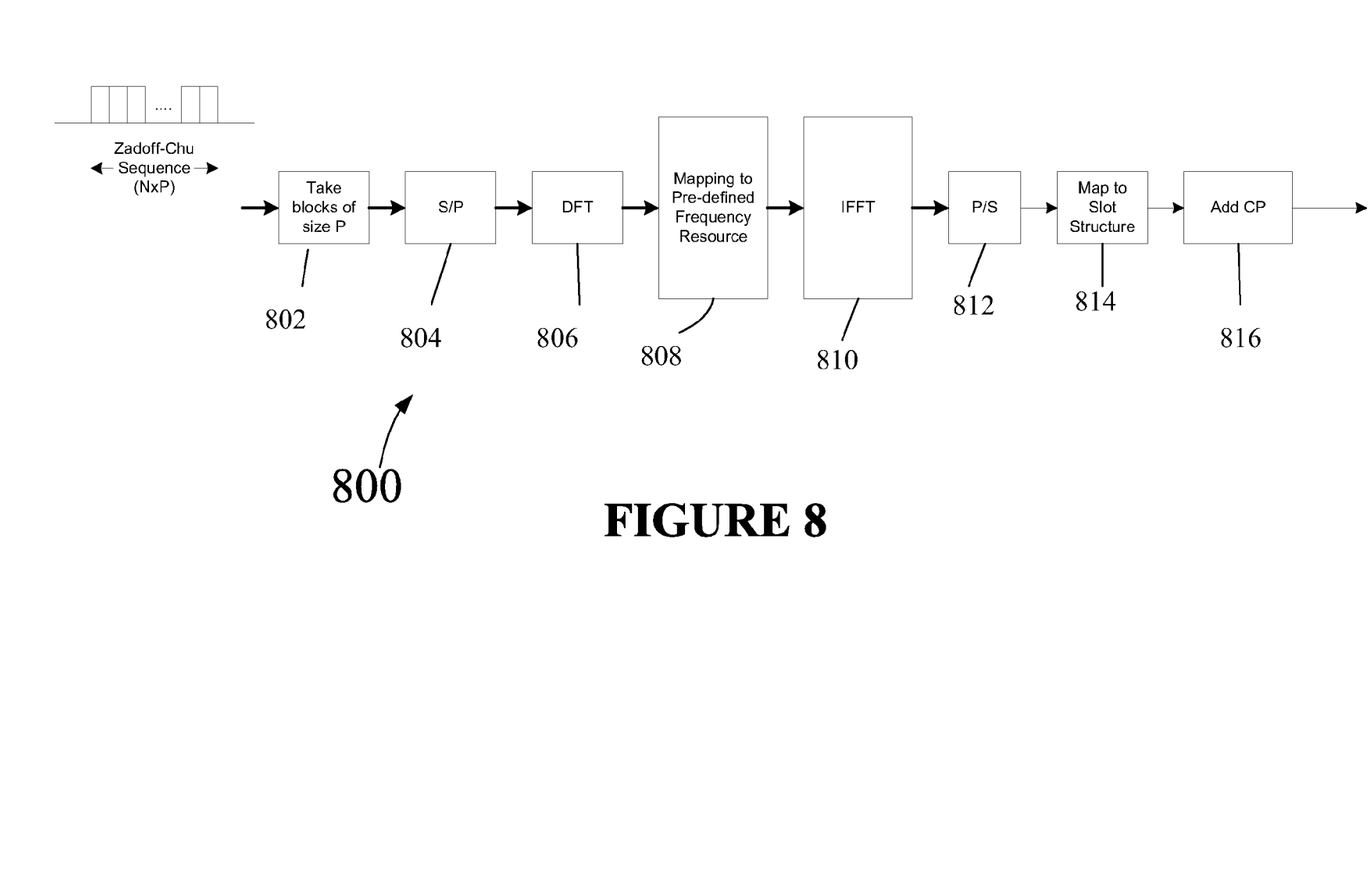
FIG. 8 is a block diagram illustration of one embodiment of a transmitter structure for the proposed signal structure.
Figure 9:
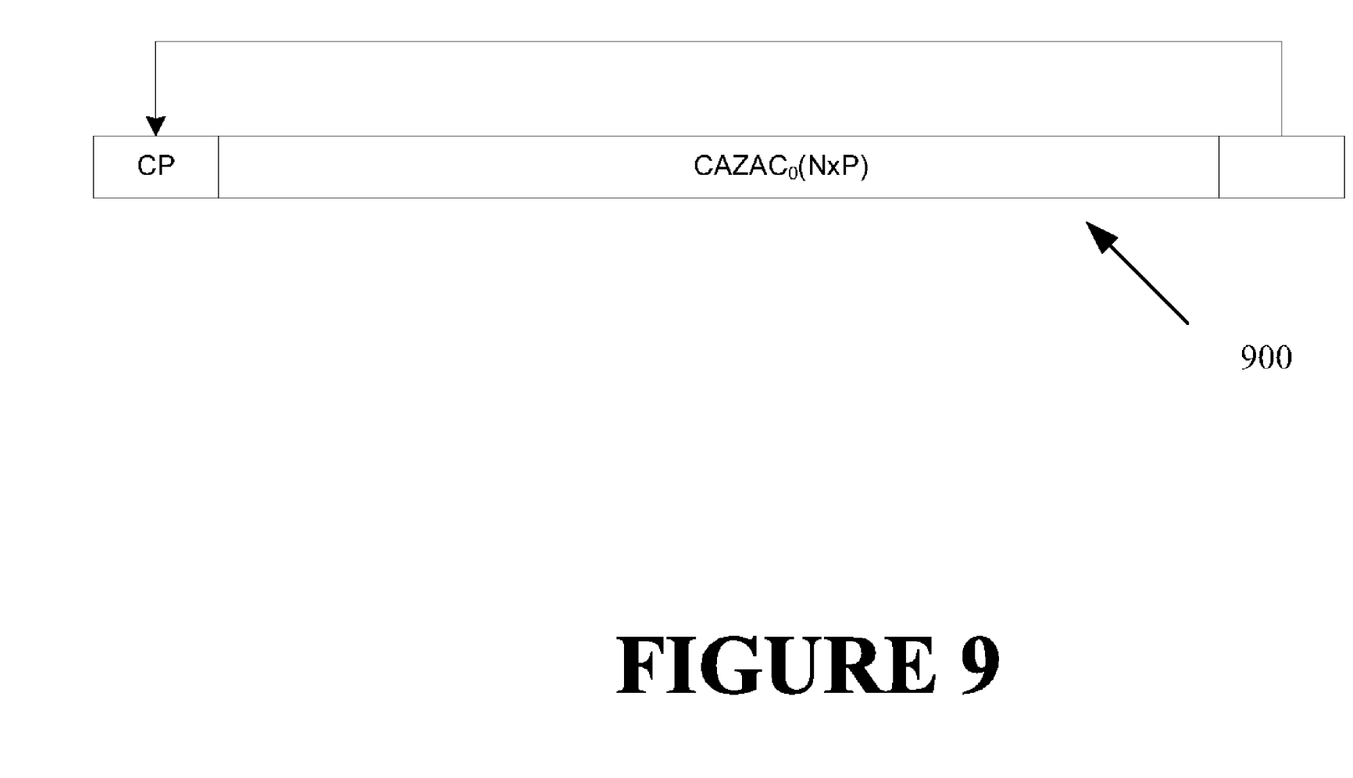
FIG. 9 illustrates a block diagram of a mechanism for generating or adding CP to truncated portions of a CAZAC sequence.

FIG. 8 is a block diagram illustration of one embodiment of a transmitter structure 800 for the proposed signal structure. The sequence of length (N×P) is broken into blocks of length P in block 802 and converted from serial stream to parallel stream in the S/P block 804 and transformed to frequency domain by a DFT 806 of length P. The frequency domain signal is mapped to a pre-defined frequency region within the entire frequency band at block 808. For example, this can be P sub-carriers at a pre-defined edge of the system bandwidth. The unused sub-carriers are set to zeros. The frequency domain signal is converted back to time-domain by IFFT 810 of size P. The output of the IFFT is parallel to serial converted at block 812. The same procedure is applied for all N blocks in a slot. Then, CP samples are added at block 816 before transmission. The mechanism 900 for generating or adding CP is conventional and is diagrammatically is shown in FIG. 9.

Figure 10:
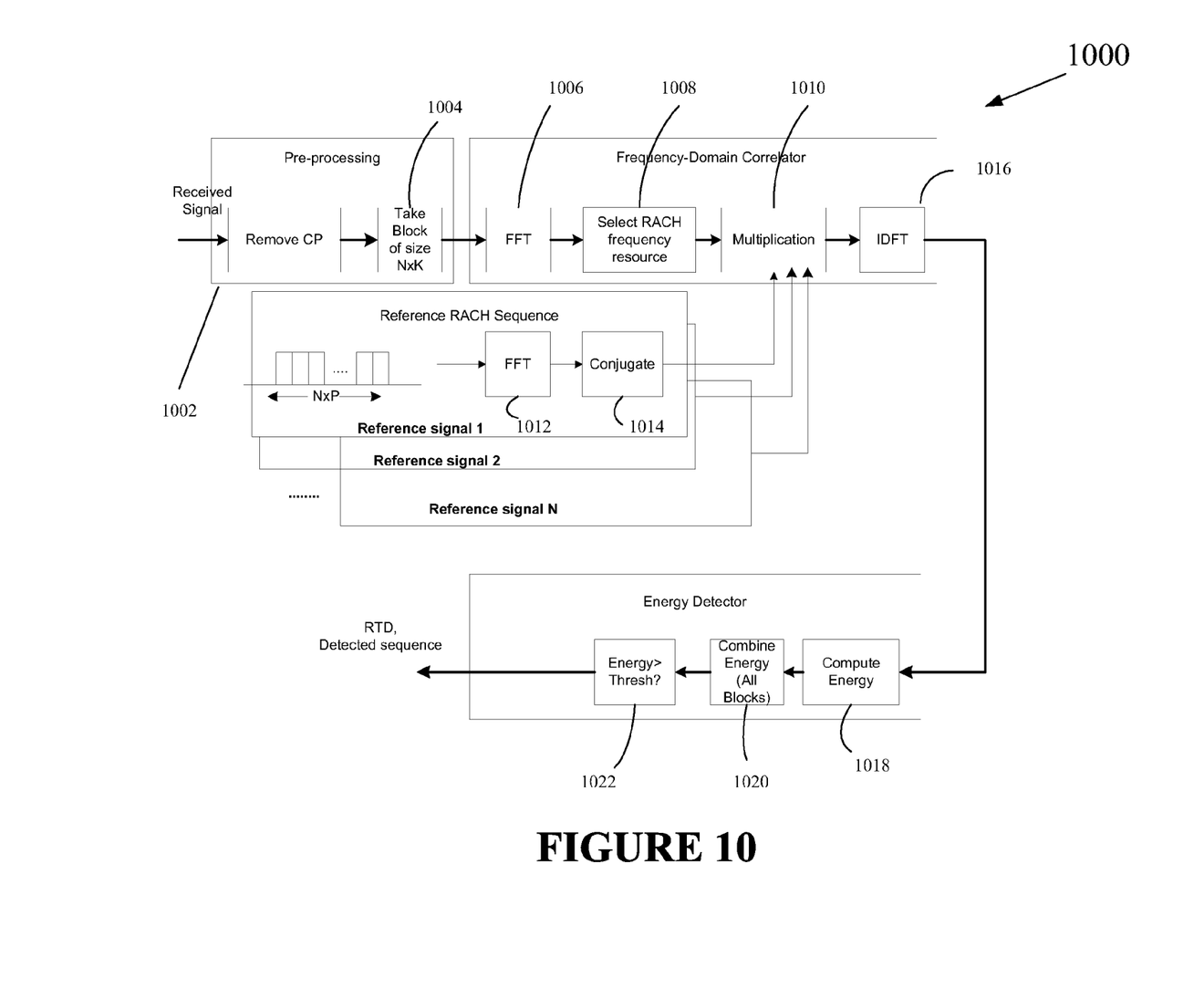
FIG. 10 illustrates a block diagram of one exemplary embodiment of a receiver structure.

One exemplary embodiment of a receiver structure 1000 is shown in FIG. 10. First, at block 1002 the signal portion corresponding to the CP length is removed from the received signal in a slot of a sub-frame. At block 1004, a signal of block length P is taken from the received signal at a time, for N blocks. Thereafter, the signal is converted to frequency-domain by an FFT 1006. A pre-defined frequency resource is selected at block 1008. The selected signal is multiplied by the reference signal at block 1010. The reference signal is generated by taking the FFT 1012 of the basic signal of length P, and by taking the complex conjugate of the FFT outputs at the block 1014. The number of reference signals is (N×P), if all (N×P) sequences are available in a cell. These signals can be pre-computed and stored to reduce the amount of real-time computation in the receiver. After the multiplication by the reference signal, the signal is converted to time domain by an IDFT 1016. The energy is computed at blocks 1018, 1020 by taking the magnitude square and combining the computed energy for all of the blocks. At block 1022, the energy is then compared with a threshold. If the energy within the search window exceeds the threshold, the signal is detected.

Those skilled in the art will appreciate that the various system layers, routines, or modules illustrated in the various embodiments herein may be executable control units (such as the controllers 210, 250 (see FIG. 2)). The controllers 210, 250 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers 210, 250 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for transmitting control information, comprising:

transmitting, from a mobile device, each of a plurality of segments of a CAZAC sequence within a corresponding one of a plurality of time-division multiplexed long blocks of a first slot of an ACK/NAK channel, wherein a number of segments in the plurality of segments is greater than or equal to the number of long blocks in the first slot.

2. A method, as set forth in claim 1, further comprising combining each of the plurality of segments with a cyclic prefix in the first slot.

3. A method, as set forth in claim 1, comprising truncating the CAZAC sequence to a length that is greater than or equal to the number of long blocks in the first slot multiplied by a sequence length associated with the long blocks.

4. A method, as set forth in claim 1, wherein transmitting each of the segments further comprises mapping the plurality of segments of the CAZAC sequence to long blocks of a slot structure including the first slot.

5. A method, as set forth in claim 4, wherein mapping the plurality of segments of the CAZAC sequence to the long blocks of the slot structure further comprises mapping each of the segments of the CAZAC sequence to a corresponding long block in the first slot.

6. A method, as set forth in claim 4, wherein mapping the plurality of segments of the CAZAC sequence further comprises mapping at least one of the plurality of segments to a reference signal block in the first slot.

7. A method, as set forth in claim 1, wherein transmitting each of the segments comprises transmitting each of the segments for coherent combination of the long blocks at a receiver.

* * * * *